Dec. 10, 1940. J. E. DISCH Re. 21,654

COUNTER UNIT FOR SHOES AND METHOD OF MAKING SAME

Original Filed Feb. 27, 1936

INVENTOR:
John E. Disch
By his attorney
Victor Cobb

Reissued Dec. 10, 1940

Re. 21,654

UNITED STATES PATENT OFFICE 21,654

COUNTER UNIT FOR SHOES AND METHOD OF MAKING SAME

John E. Disch, Dolgeville, N. Y., assignor, by mesne assignments, to United Shoe Machinery Corporation, Borough of Flemington, N. J., a corporation of New Jersey Original No. 2,050,831, dated August 11, 1936, Serial No. 65,943, February 27, 1936. Application for reissue August 6, 1938, Serial No. 223,551

9 Claims. (Cl. 12—146)

My invention relates to footwear and more particularly to women's shoes and slippers, and especially to the counters or heel-stiffeners in such footwear which, with ordinary usage, have a tendency to collapse or to become so distorted as to impair their appearance as well as their serviceability in use.

Ordinarily a cemented shoe or slipper is made with a space or pocket in the back of the shoe between the inner lining and outer cover portion of the shoe for the insertion of the counter stiffener, with the result that there has always been a large amount of undesired play in the back or heel portion of the shoe, because the stiffener did not reach the edges or contours of the enveloping pocket formed by the outer cover and inner lining. Frequently an unsightly distortion was occasioned because the edges of the lining and cover were turned over the stiffener in one direction or the other.

To overcome these defects and disadvantages incidental to shoes and slippers of this type, I have now provided an improved unit counter portion that is separately assembled apart from the shoe, and the objects of my invention are, among other things, to form a new type of cemented and stitched counter unit which will retain its shape under all conditions of use and wear, and at the same time give a smooth surface both inside and outside of the counter and in the shoe itself.

The uniform edges of the lining and cover portion are secured by stitching throughout, which also maintains the exact outline of the counter with the result that the rigidly cemented and stitched parts after assembly form a counter unit that will give long wear and also preserve a neat appearance in the shoe.

A further object of my invention is to provide an exceptionally simple but highly effective counter unit to be embodied in shoes and slippers of this type which may be economically manufactured and which will retain its natural shape and contour in use.

Other objects and advantages will appear from the following description when taken with the annexed drawing in which Fig. 1 is a perspective view of the molded counter stiffener, the outer cover and inner lining, before these parts are assembled as a counter unit;

Similar numerals refer to similar parts throughout the several figures.

As shown, the body portion of my improved counter unit comprises the stiffener 12, preferably made of stiff leather or other suitable material, molded to embrace the heel of the foot with the bottom portion bent inwardly to form the inturned flange 13 for attachment to the heel-seat of the shoe, such flange 13 defining a space 14 for the insole of the shoe to be cemented or otherwise secured to the heel-seat portion of the outsole.

Figure 2:
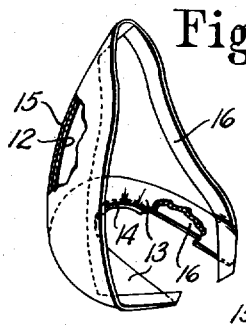
Fig. 2 is a perspective view of the stiffener having the outer cover cemented thereto with the edges of the outer cover overlapping the stiffener.

The outer cover 15 is preferably formed and cut from soft leather or fabric in somewhat triangular form of slightly larger size and shape than the stiffener 12 so that its marginal edges 16, when cemented to the outer surface of the stiffener, will overlap the edges of the stiffener and the under part of the marginal flange 13, as shown in Fig. 2.

Figure 1:
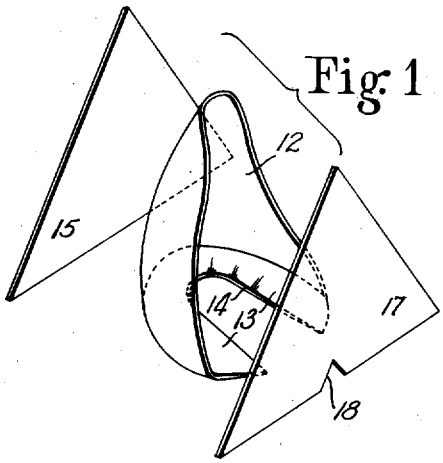
Figure 3:
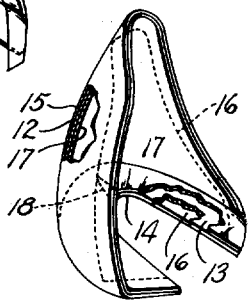
Fig. 3 is a perspective view, somewhat similar to Fig. 2, showing the inner lining cemented to the inner surface of the stiffener.

The inner lining 17 is also preferably formed and cut from soft leather in triangular form, as shown in Fig. 1, with the V-shaped notch 18 cut therein so that when the inner lining 17 is molded and cemented to the inner surface of the stiffener the edges of the notch 18 will be brought together to form a smooth bottom surface around the top surface of the marginal flange 13, as shown in Fig. 3.

The method of assembling and uniting the parts shown in Fig. 1 is substantially as follows: The stiffener 12 having been suitably shaped and the outer cover 15 and inner lining 17 having been cut substantially in forms shown in Fig. 1, I next spread any suitable cement or other form of adhesive on the outer and inner surfaces of the stiffener.

I then hold the stiffener firmly and stretch the outer cover 15 over the outside body portion of the stiffener and fold the marginal edges 16 over the sides of the stiffener and under the front edges of the inturned flange 13, all as shown in Fig. 2.

Figure 5:
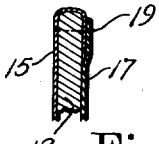
Fig. 5 is an enlarged sectional view taken on the line 5—5 of Fig. 4.

I then take the inner lining 17 and mold the same by stretching it face down over a form, and, while holding the same rigidly, the covered stiffener is pressed down over the lining 17. The cement on the lining 17 and on the inner surface of the stiffener holds fast the lining 17 to the inside of the stiffener, as shown in Fig. 3. Any surplus lining may be trimmed from the edges so that the outer edge of the lining 17 is coincident with the folded-over part of the cover 15, as shown in detail in Fig. 5.

Figure 4:
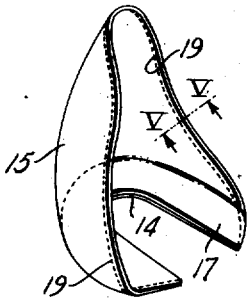
Fig. 4 is a perspective view showing the next step in my method with the stitching passing through the outer cover, stiffener and inner lining.

As the last step, a line of stitching 19 is passed through the cover 15, the stiffener 12 and the inner lining 17, as shown in Fig. 4, such stitching 19 firmly uniting the three component parts or plies of my improved unit in lamellar relation so as to avoid any play between the parts and also to provide a reinforced edge to the counter unit construction.

The counter unit is incorporated in a shoe by placing the same between the insole and the heel-seat in which the rear portion of the insole is cemented or otherwise fastened through the space 14 to the top of the heel. The shoe is lasted in the usual manner. During the lasting operation this improved counter unit that I have shown and described becomes perfectly fitted to the shoe.

By this arrangement the shoe is prevented from slipping up and down the heel, and uncomfortable chafing and resulting wear on the stocking and lining are avoided.

Many changes in the foregoing embodiment of my invention may be made without sacrificing its advantages and without departing from the scope of my invention as set forth in the appended claims.

I claim as my invention:

1. A counter unit for shoes comprising a stiff body portion molded to the required shape, an outer cover having overlapping edges bent inwardly over the edges of the body portion and fastened to the inner surface thereof, an inner lining cemented to the inner surface of the body portion having its marginal portions overlapping the bent-over edges of the outer cover, and stitches passing through the marginal edges of the outer cover, body portion and inner lining.

2. A counter unit for shoes comprising a molded body portion having its bottom portion bent inwardly to form an inturned marginal flange extending around the back and sides of the body portion, an outer cover cemented to the outer surfaces of the body and inturned flange, an inner lining cemented to the inner surfaces of the body portion and inturned flange, and stitches passing through the marginal edges of the cover, body portion and inner lining.

3. A counter unit for shoes comprising a molded body portion having its bottom portion bent inwardly to form an inturned marginal flange extending around the back and sides of the body portion, an outer cover cemented to the outer surfaces of the body and inturned flange, an inner lining cemented to the inner surfaces of the body portion and inturned flange, and stitches passing through the marginal edges of the cover, body portion, inner lining, and of the front edges of the inturned flange.

4. A counter unit for shoes comprising a molded body portion having its bottom portion bent inwardly to form an inturned marginal flange extending around the back and sides of the body portion, an outer cover cemented to the outer exposed surfaces of the body and inturned flange, said cover having an overlapping margin bent inwardly over the edges of the body portion and fastened to the inner surface thereof, an inner lining cemented to the inner surfaces of the body portion and inturned flange, said inner lining having its marginal portion overlappng the bent-over edges of the outer cover, and stitches through the marginal edges of the cover, body portion and inner lining.

5. A method of making a counter unit for shoes which comprises applying a coating of cement or adhesive to both outer and inner surfaces of a molded body portion, then applying an outer cover having an overlapping margin to the cemented outer surface of the body portion with the overlapping margin folded over the edges of the body portion and cemented to the inner surface of the body portion, then applying an inner lining to the cemented inner surface of the body portion with its marginal edge overlapping the folded-over margin of the outer cover, and finally stitching together the marginal edges of the outer cover, body portion and inner lining.

6. A method of making a counter unit for shoes which comprises applying a coating of cement or adhesive to both outer and inner surfaces of a molded body portion, then applying an outer cover having an overlapping margin to the cemented outer surface of the body portion with the overlapping margin folded over the edges of the body portion and cemented to the inner surface of the body portion, then applying an inner lining to the cemented inner surface of the body portion with its marginal edge overlapping the folded-over margin of the outer cover, then trimming the surplus material of the inner lining to bring its outer edge coincident with the folded-over edge of the outer cover, and finally stitching together the marginal edges of the outer cover, body portion and inner lining.

7. In methods of making lamellar counter units for shoes and slippers, that improvement which comprises providing a stiff layer molded to finished shape, molding a flexible layer to shape over a form, and then while said flexible layer is on the form integrating the stiff layer thereto preliminary to assembling any of the layers on a last.

8. In methods of making lamellar counter units for shoes and slippers, that improvement which comprises providing a stiff layer molded to finished shape, securing a flexible layer over the outer surfaces of said molded layer, molding another flexible layer to shape over a form, and then while said last-mentioned flexible layer is on the form integrating the inner surfaces of the stiff layer thereto.

9. In methods of making lamellar counter units for shoes and slippers, that improvement which comprises providing a stiff layer molded to finished shape, securing a flexible layer over the outer surfaces of said molded layer and over the top and side edges thereof, molding another flexible layer to shape over a form, and then while said last-mentioned flexible layer is on the form integrating the inner surfaces of the stiff layer thereto.

JOHN E. DISCH.